US007658361B2

(12) United States Patent
Vihauer

(10) Patent No.: US 7,658,361 B2
(45) Date of Patent: Feb. 9, 2010

(54) WINDOW FRAME DISPLAY STAND

(75) Inventor: Kevin Dwayne Vihauer, Puyallup, WA (US)

(73) Assignee: Milgard Manufacturing Incorporated, Tacoma, WA (US)

( * ) Notice: Subject to any disclaimer, the term of this patent is extended or adjusted under 35 U.S.C. 154(b) by 0 days.

(21) Appl. No.: 11/985,477

(22) Filed: Nov. 15, 2007

(65) Prior Publication Data

US 2009/0127409 A1 May 21, 2009

(51) Int. Cl.
*A47F 1/14* (2006.01)
*A47G 1/16* (2006.01)
*B60R 1/02* (2006.01)

(52) U.S. Cl. ........................ 248/473; 248/466; 248/469

(58) Field of Classification Search ................. 248/473, 248/472, 469, 466; 211/11, 55, 50; 40/730, 40/739, 741, 752
See application file for complete search history.

(56) References Cited

U.S. PATENT DOCUMENTS

D11,249 S * 6/1879 Reed ........................... D6/310
1,426,983 A 8/1922 Guardino
1,557,950 A * 10/1925 Wassermann ................ 211/11
3,759,385 A 9/1973 Juhlin
3,759,395 A * 9/1973 Juhlin ......................... 211/40
4,000,843 A * 1/1977 Sorensen et al. ............ 206/586
4,909,398 A * 3/1990 Santucci ...................... 211/50
4,960,258 A 10/1990 Stocker et al.
5,664,749 A 9/1997 Kump et al.
D417,805 S 12/1999 Bramsiepe et al.
D442,404 S 5/2001 Bramsiepe et al.
2002/0109051 A1 * 8/2002 Kitagawa et al. ............ 248/127

* cited by examiner

*Primary Examiner*—Amy J Sterling
(74) *Attorney, Agent, or Firm*—Reising Ethington P.C.

(57) ABSTRACT

A window frame display stand includes a corner body having a pair of mutually perpendicular legs, and a pair of spaced feet on one of the legs for supporting the body on a support surface such that the one leg is parallel to the support surface and the other leg is perpendicular to the support surface. The legs have adjacent interior surfaces that are contoured, preferably with slots or notches, to receive and support a window frame corner. The legs on the corner body preferably are mirror images of each other. The feet preferably are removably mounted on the one leg of the corner body, most preferably by interference press fit of the corner body leg into slots on the feet.

13 Claims, 3 Drawing Sheets

WINDOW FRAME DISPLAY STAND

The present disclosure relates to a stand for displaying a window frame at a trade show or a retail store, for example.

BACKGROUND AND SUMMARY OF THE DISCLOSURE

A general object of the present disclosure is to provide a stand for displaying a window frame, such as a window frame corner, a complete window frame or a complete window including a window frame, at a trade show or a retail store, for example.

The present disclosure embodies a number of aspects that can be implemented separately from or in combination with each other.

A window frame display stand, in accordance with one aspect of an exemplary embodiment of the disclosure, includes a corner body having a pair of mutually perpendicular legs, and at least one foot on one of the legs for supporting the body on a support surface such that the one leg is parallel to the support surface and the other leg is perpendicular to the support surface. The legs have adjacent interior surfaces that are contoured, preferably with slots or notches, to receive and support a window frame corner. The legs on the corner body preferably are mirror images of each other. The foot preferably is removably mounted on the leg of the corner body, most preferably by interference press fit of the corner body leg into slots on the foot. In one embodiment for supporting a frame corner, there are a pair of spaced feet on the corner body. In another embodiment for supporting spaced corners of a window frame, there are a pair of corner bodies, each having at least one foot, which are mirror images of each other.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
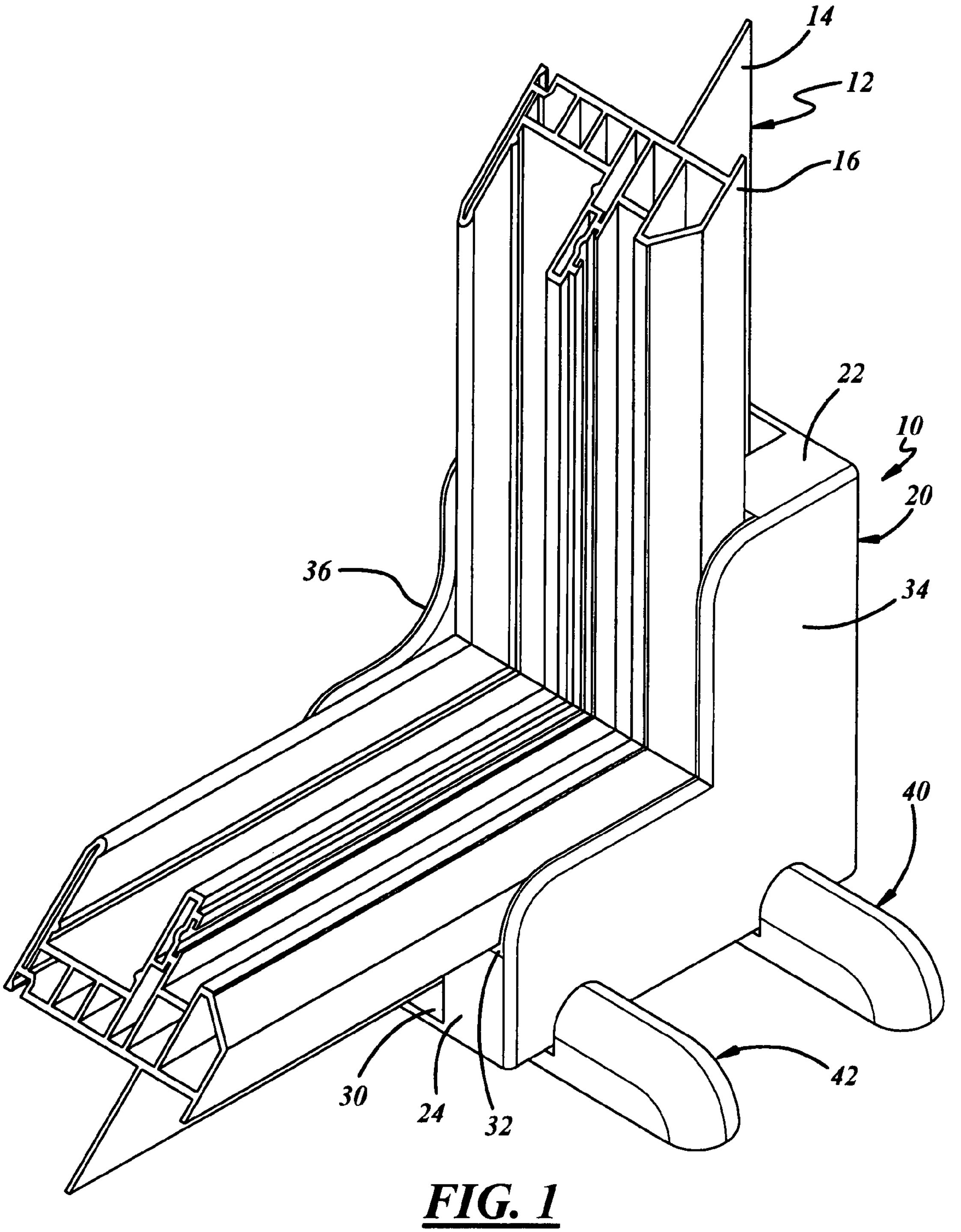
FIG. 1 is a perspective view of a window frame display stand in accordance with one exemplary embodiment of the present disclosure and illustrated in combination with an exemplary window frame corner.

FIG. 1 illustrates a window frame display stand 10 in accordance with an exemplary embodiment of the present disclosure on which a window frame corner 12 is mounted for display purposes. The contours of window frame corner 12 are exemplary only. The illustrated corner 12 has a frame mounting flange 14 and a lip 16, by means of which the corner is located on stand 10.

FIGS. 2-5 illustrate window frame display stand 10 in greater detail. Window frame display stand 10 includes an L-shaped corner body 20 having mutually perpendicular legs 22, 24. Legs 22, 24 preferably are mirror images of each other. Legs 22, 24 have adjacent interior surfaces 26, 28 that are contoured to receive frame corner 12. In particular, in this exemplary embodiment, there is an L-shaped slot 30 that extends along leg 24 and then along leg 22 for receiving frame flange 14, and an L-shaped slot or notch 32 that extends along leg 24 and leg 22 for receiving frame lip 16.

Figure 2:
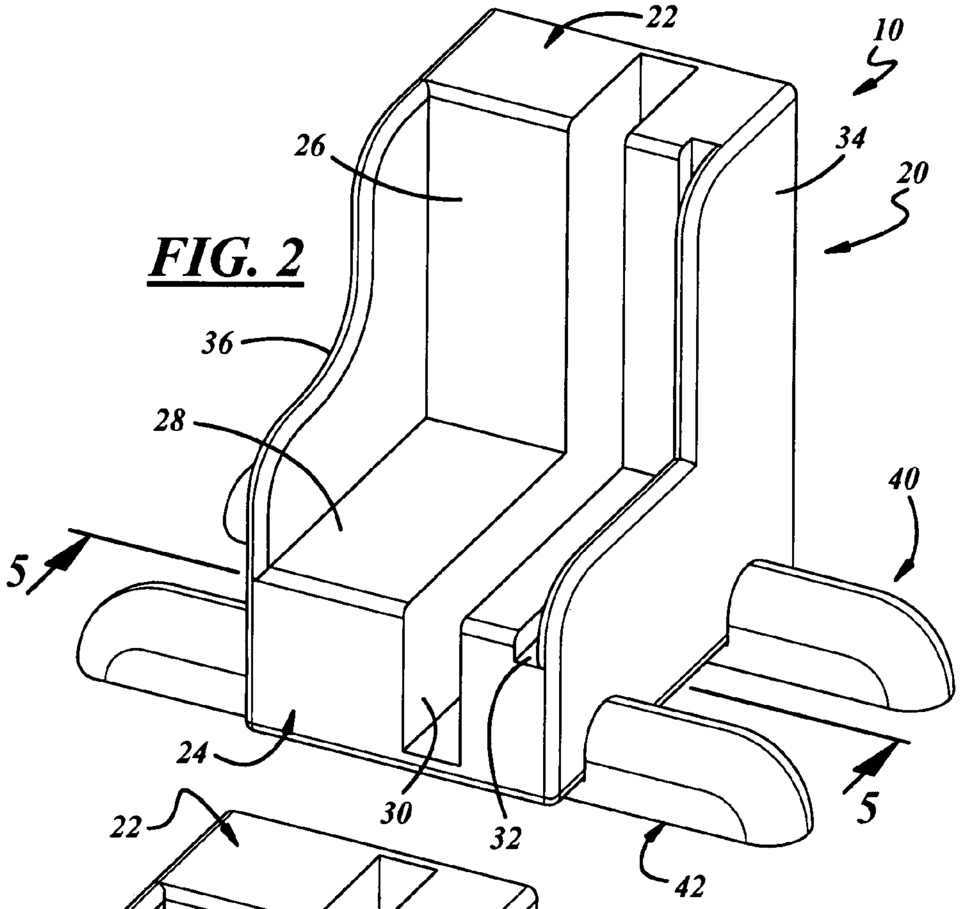
FIG. 2 is a perspective view of the window frame display stand in FIG. 1 without the window frame corner.
Figure 3:
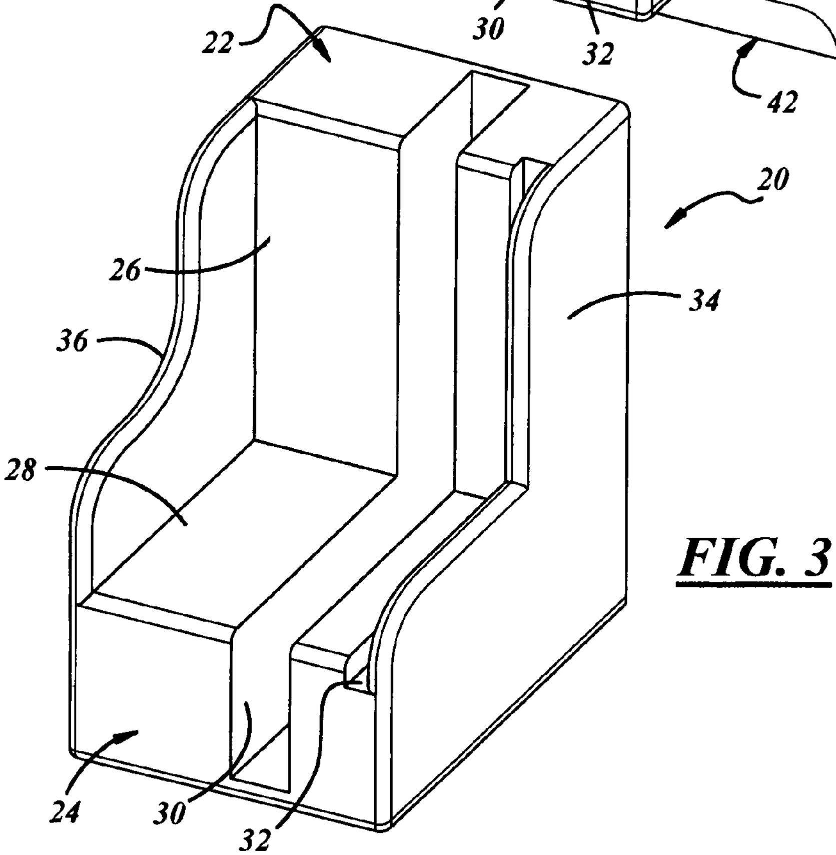
FIG. 3 is a perspective view of the corner body in the stand of FIG. 2.
Figure 4:
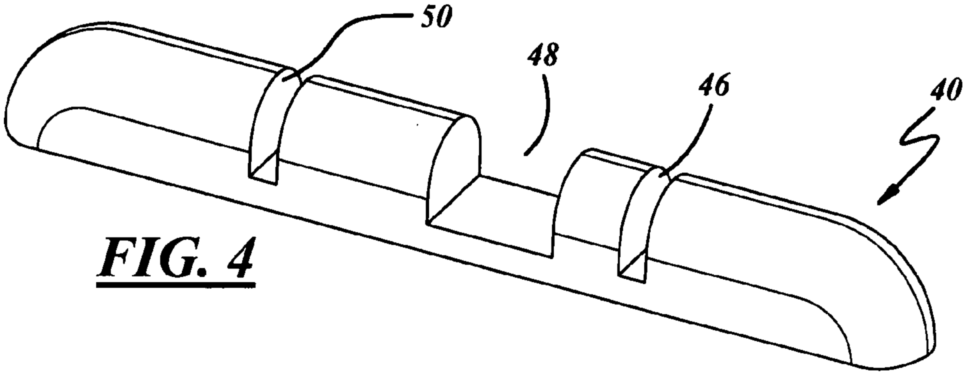
FIG. 4 is a perspective view of one of the corner body support feet in the stand of FIG. 2.

Corner body 20 preferably also has a pair of laterally spaced sidewalls 34, 36 that extend along the respective side surfaces of the corner body along and between legs 22, 24. Wall 34 comprises a front wall and is deeply notched as shown in FIGS. 1-3 so that the details of window frame 12 can be observed. Opposing wall 36 can be less deeply notched. Walls 34, 36 preferably are parallel to each other, and preferably are spaced to receive frame corner 12 by a tight fit to embrace and support frame 12 firmly in place on display stand 10.

Figure 5:
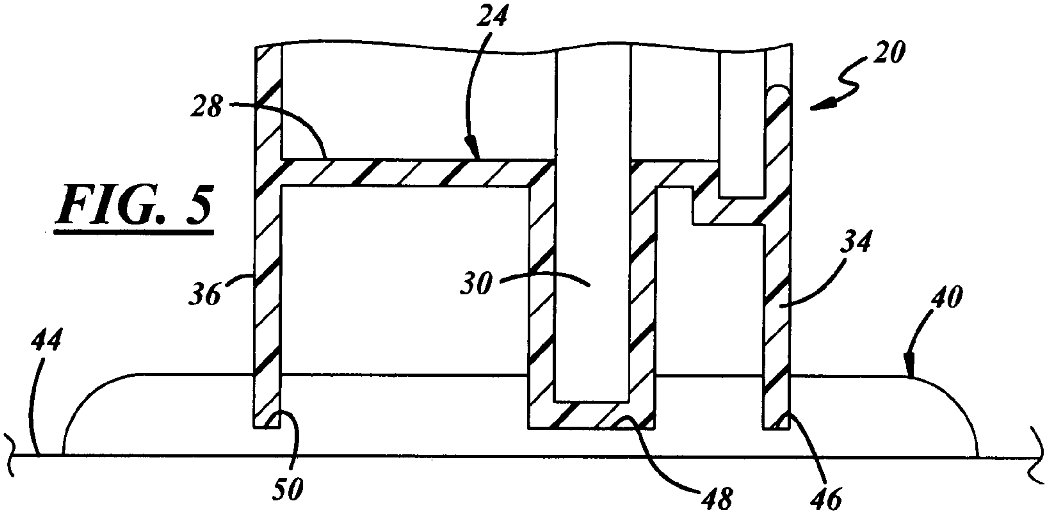
FIG. 5 is a fragmentary sectional view taken substantially along the line 5-5 in FIG. 2.

A pair of support feet 40, 42 are secured to leg 24 of corner body 20 for supporting corner body 20 and stand 10 on a support surface 44 (FIG. 5). Feet 40, 42 preferably are identical, with foot 40 being illustrated in detail in FIGS. 4 and 5. Foot 40 has at least one slot, and preferably a plurality of spaced slots 46, 48, 50 for receiving leg 24 by interference press fit. That is, in the illustrated exemplary embodiment, slot 46 receives sidewall 34, slot 48 receives the exterior of slot 30, and slot 50 receives sidewall 36 of corner body 20. Spaced legs 40, 42 thus support corner body 20 such that one of the legs 22, 24 (leg 24 in this example) is parallel to support surface 44 while the other leg 22, 24 (leg 22 in this example) is perpendicular to support surface 44.

Figure 6:
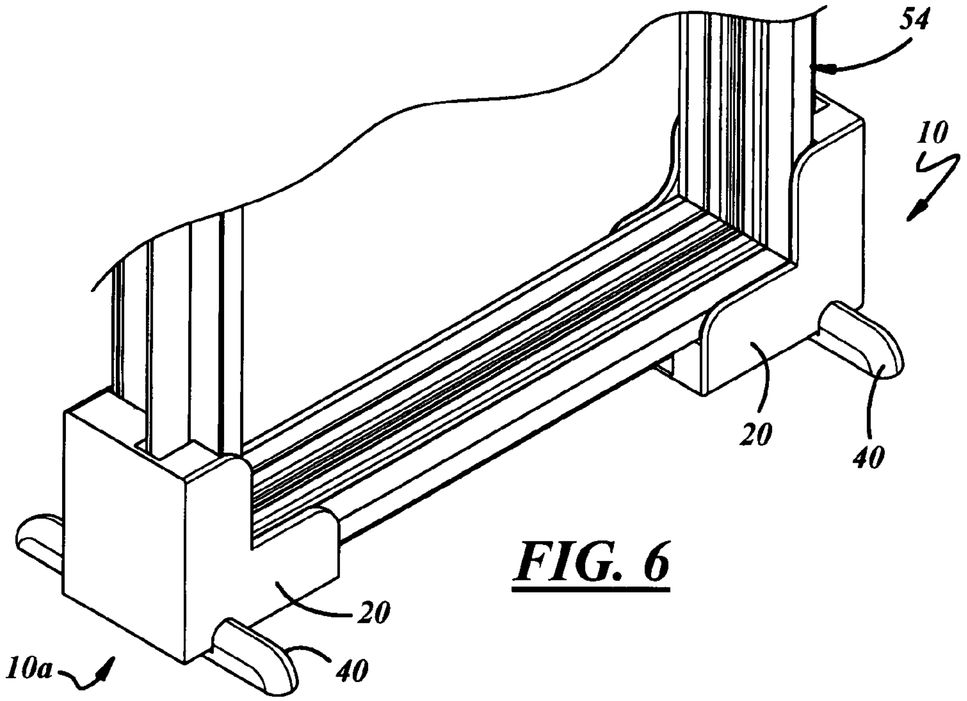
FIG. 6 is a fragmentary perspective view of a pair of opposed display stands supporting spaced corners of a window frame.

Support stand 10 configured as illustrated in FIGS. 1-5 supports frame corner 12 for display purposes. Two stands 10, **10*a* can be employed for displaying a complete window frame 54, or a lower portion of a window frame, for example, as illustrated in FIG. 6. Stands 10, 10*a* are mirror images of each other. Only one support leg 40 need be used in each stand, although both legs 40, 42 could be used in either or both stands. Stands 10, 10*a* support spaced corners of window frame 46. Two stands 10, 10*a*** can be employed for displaying a complete window frame or for displaying a complete window including interior glass, etc.

Stand 10, including corner body 20 and feet 40, 42, preferably is of molded plastic construction. A logo or the like can be molded into sidewall 34. Removability of feet 40, 42 is preferred not only for display versatility, but also for compact storage of the display stand when not in use.

There thus has been disclosed a window frame display stand that fully satisfies all of the objects and aims previously set forth. The window frame display stand has been disclosed in conjunction with an exemplary embodiment, and various modifications and variations have been discussed. Other modifications and variations readily will suggest themselves to persons of ordinary skill in the art in view of the foregoing description. The disclosure is intended to embrace all such modifications and variations as fall within the spirit and broad scope of the appended claims.

The invention claimed is:

1. A window frame display stand that includes:

an L-shaped corner body having a pair of mutually perpendicular legs that are mirror images of each other, and at least one foot removably secured to one of said legs for supporting said body on a support surface such that said one of said legs is parallel to the support surface and the other of said legs is perpendicular to the support surface, said at least one foot having at least one slot in which said one leg is removably received by interference press fit, said legs having adjacent interior surfaces that are contoured to receive and support a window frame corner and that include at least one L-shaped slot extending along both of said legs to receive at least one of a frame mounting flange or lip.

2. The display stand set forth in claim 1 including a pair of said corner bodies each having said at least one foot, with said corner bodies and said feet being mirror images of each other for supporting spaced corners of a window frame.

3. The display stand set forth in claim 1 wherein said at least one foot includes a pair of spaced feet removably press-fit on said one leg.

4. The display stand set forth in claim 1 wherein said corner body has walls extending between said legs and spaced from each other to receive, embrace and support opposed sides of a window frame corner.

5. A window frame display stand that includes:

a corner body having a pair of mutually perpendicular legs, said legs being mirror images of each other and having adjacent interior surfaces that are contoured to receive and support a window frame corner and that include at least one slot in both of said legs to receive at least one of a frame mounting flange or lip, and a pair of walls extending between said legs and spaced from each other tightly to receive, embrace and support opposed sides of the window frame corner, and at least one foot removably secured to one of said legs for supporting said corner body on a support surface such that said one leg is parallel to the support surface and the other of said legs is perpendicular to the support surface, said at least one foot having at least one slot in which said one leg is removably received by interference press fit.

6. The display stand set forth in claim 5 wherein said at least one foot includes a pair of spaced feet on said one leg.

7. The display stand set forth in claim 5 including a pair of said corner bodies, each having said at least one foot, with said corner bodies and said feet being mirror images of each other for supporting spaced corners of a window frame.

8. The display stand set forth in claim 7 wherein said feet have slots in which said legs are received by interference press fit.

9. The display stand set forth in claim 1 further comprising a pair of walls extending between said legs and spaced from each other tightly to receive, embrace and support opposed sides of the window frame corner.

10. The display stand set forth in claim 9 wherein said pair of walls includes a front wall and an opposing wall, wherein the front wall is more deeply notched than the opposing wall.

11. The display stand set forth in claim 1 wherein said at least one slot includes a first slot to receive the frame mounting flange and a second slot to receive the frame lip.

12. The display stand set forth in claim 5 wherein said pair of walls includes a front wall and an opposing wall, wherein the front wall is more deeply notched than the opposing wall.

13. The display stand set forth in claim 5 wherein said at least one slot includes a first slot to receive the frame mounting flange and a second slot to receive the frame lip.

* * * * *